(12) United States Patent
Lanker

(10) Patent No.: US 7,306,545 B2
(45) Date of Patent: Dec. 11, 2007

(54) TRANSFER CASE CLUTCH CALIBRATION METHOD

(75) Inventor: Christopher J. Lanker, Clarkston, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 232 days.

(21) Appl. No.: 11/169,029

(22) Filed: Jun. 28, 2005

(65) Prior Publication Data

US 2006/0293145 A1 Dec. 28, 2006

(51) Int. Cl.
- *B60W 10/02* (2006.01)
- *B60W 10/04* (2006.01)
- *G06F 7/00* (2006.01)
- *G06F 17/00* (2006.01)
- *G06F 19/00* (2006.01)

(52) U.S. Cl. .................. 477/181; 477/180; 701/68

(58) Field of Classification Search ............ 477/180, 477/181; 701/67, 68
See application file for complete search history.

(56) References Cited

U.S. PATENT DOCUMENTS

| | | | |
|---|---|---|---|
| 4,989,471 A | 2/1991 | Bulgrien | |
| 5,012,416 A | 4/1991 | Bulgrien et al. | |
| 5,065,849 A | 11/1991 | Kono et al. | |
| 5,307,269 A | 4/1994 | Kohno | |
| 5,407,024 A * | 4/1995 | Watson et al. | 180/248 |
| 6,213,242 B1 * | 4/2001 | Rodrigues et al. | 180/249 |
| 6,319,170 B1 | 11/2001 | Hubbard et al. | |
| 6,321,142 B1 | 11/2001 | Shutty | |
| 6,347,271 B1 | 2/2002 | Showalter | |
| 6,397,139 B1 | 5/2002 | Rodrigues et al. | |
| 6,494,810 B1 | 12/2002 | Mack et al. | |
| 6,568,256 B1 * | 5/2003 | Lee | 73/118.1 |
| 6,645,108 B1 * | 11/2003 | Gradu | 475/151 |
| 6,695,748 B2 | 2/2004 | Kopec et al. | |
| 6,697,725 B1 * | 2/2004 | Williams | 701/69 |
| 6,712,728 B2 * | 3/2004 | Gradu | 475/152 |
| 6,833,516 B2 | 12/2004 | Breed et al. | |
| 6,834,225 B1 * | 12/2004 | Jiang et al. | 701/67 |
| 6,896,112 B2 | 5/2005 | Berger et al. | |
| 6,945,374 B2 * | 9/2005 | Puiu | 192/35 |
| 2004/0049324 A1 * | 3/2004 | Walker | 701/1 |
| 2007/0061060 A1 * | 3/2007 | Karrelmeyer et al. | 701/67 |

FOREIGN PATENT DOCUMENTS

| | | |
|---|---|---|
| DE | 197 39 215 A1 | 3/1998 |
| EP | 1 561 951 A2 | 1/2005 |
| EP | 1 600 668 A2 | 5/2005 |
| JP | 56-98631 A | 8/1981 |
| JP | 2003-254418 A | 9/2003 |
| WO | WO 03/097396 A1 | 11/2003 |

* cited by examiner

*Primary Examiner*—Tisha Lewis
(74) *Attorney, Agent, or Firm*—Brinks Hofer Gilson & Lione; William G. Anderson

(57) ABSTRACT

A method of improving performance of secondary driveline clutches in motor vehicle transfer cases includes the steps of testing each manufactured transfer case to determine the clutch drive current versus torque transfer function, fitting such determined function to one of a small number of predetermined performance curves and incorporating an identification of the selected one of such predetermined performance curves in the transfer case. When the transfer case is installed in a vehicle, the curve identification is read and the transfer case control module (TCCM) adjusts its clutch drive signal in accordance with the predetermined curve to achieve known and desired torque transfer through the clutch with a given clutch drive signal.

20 Claims, 7 Drawing Sheets

CURVE A

CURVE B

CURVE I

CURVE J

CLUTCH DRIVE VS. OUTPUT VARIATION

| CONTRIBUTION | TC W/O CALIBRATION | | TC W/ CALIBRATION |
|---|---|---|---|
| | ACTUAL | | ESTIMATE |
| TOTAL | 33% | | 9% |
| | INTER-UNIT VARIATION | | |
| PRIMARY CLUTCH 6 SIGMA | 10% | | 5% |
| SECONDARY CLUTCH 6 SIGMA | 7% | | 1% |
| | | INTRA-UNIT VARIATION | |
| THERMAL | 2.8% | | 1% |
| AGE/OIL/OTHER WEAR DURABILITY | 14% | | 2% |

FIG. 5

TRANSFER CASE CLUTCH CALIBRATION METHOD

BACKGROUND OF THE INVENTION

The invention relates generally to a method for achieving improved transfer case clutch performance and more particularly to a method which determines the clutch current versus torque throughput function and utilizes such determination to achieve improved transfer case clutch performance.

Many four wheel drive vehicles nominally operate in two wheel drive and include sensors and control systems which automatically shift a transfer case clutch to four wheel drive upon detection of a wheel speed difference ($\Delta s$) typically between the front and rear wheels. Such adaptive four wheel drive systems are carefully tuned by the vehicle manufacturer, typically through extensive road testing, to achieve desired performance and optimum safety and control. The primary operating parameter so determined is the relationship between wheel slip and the speed and extent of transfer case clutch engagement per unit time ($dc/dt$) when a threshold quantum of wheel slip is encountered. In such vehicles, the sensing of wheel speed, the computations undertaken to determine wheel slip and the clutch engagement control signal issued when wheel slip is determined are all electronic signals and operations determined and undertaken in accordance with the program or software utilized in the transfer case controller which is either developed or adapted by the vehicle manufacturer.

Such electrical output or drive system to the transfer case clutch assumes an established clutch current versus clutch engagement and torque transfer function. Since the transfer case clutch is an electromechanical or hydromechanical device, the accuracy and repeatability of its operation encompasses wider tolerances than the electronic clutch control system.

The present invention is directed to improving the operation and cooperation and between a motor vehicle transfer case controller and the transfer case clutch.

SUMMARY OF THE INVENTION

A method of improving performance of modulatable, secondary driveline clutches in motor vehicle transfer cases determines, records and provides clutch calibration data to a controller in the motor vehicle. The method includes the steps of testing each manufactured transfer case to determine the clutch drive current versus torque transfer function, fitting such determined function to one of a small number of pre-established performance functions or curves and incorporating an identification of the selected one of such pre-established performance curves in the transfer case. When the transfer case is installed in a vehicle, the curve identification is read, either physically or electronically, and the transfer case control module (TCCM) adjusts its clutch drive signal in accordance with the pre-established curve to achieve known and desired torque transfer through the clutch with a given clutch drive signal. Information in addition to the basic clutch torque transfer function, such as transfer case operating temperature and an age or wear characteristic may also be provided to the transfer case control module to further enhance operation.

Thus it is an object of the present invention to provide a method of improving the operation of a transfer case secondary driveline clutch.

Thus it is a further object of the present invention to provide a method of improving the overall operation of a transfer case control module and a transfer case secondary driveline clutch.

It is a further object of the present invention to provide a method of determining the clutch current versus clutch engagement function of an individual transfer case, fitting such determined function to one of a small number of pre-established functions and ultimately providing such function to the transfer case control module in which the transfer case is installed.

It is a still further object of the present invention to provide a transfer case which provides operating temperature data to the vehicle transfer case control module.

It is a still further object of the present invention to provide production calibration of a transfer case secondary driveline clutch and, utilizing such information, to adjust the clutch drive signal of a transfer case control module to achieve improved secondary clutch, transfer case and vehicle performance.

Further objects and advantages of the present invention will become apparent by reference to the following description of the preferred embodiment and appended drawings wherein like reference numbers refer to the same component, element or feature.

BRIEF DESCRIPTION OF THE DRAWINGS

FIG. 5 is a chart illustrating the improvement in inter-unit and intra-unit transfer case secondary clutch variation by utilization of the present invention;

DETAILED DESCRIPTION OF THE PREFERRED EMBODIMENT

Figure 1:
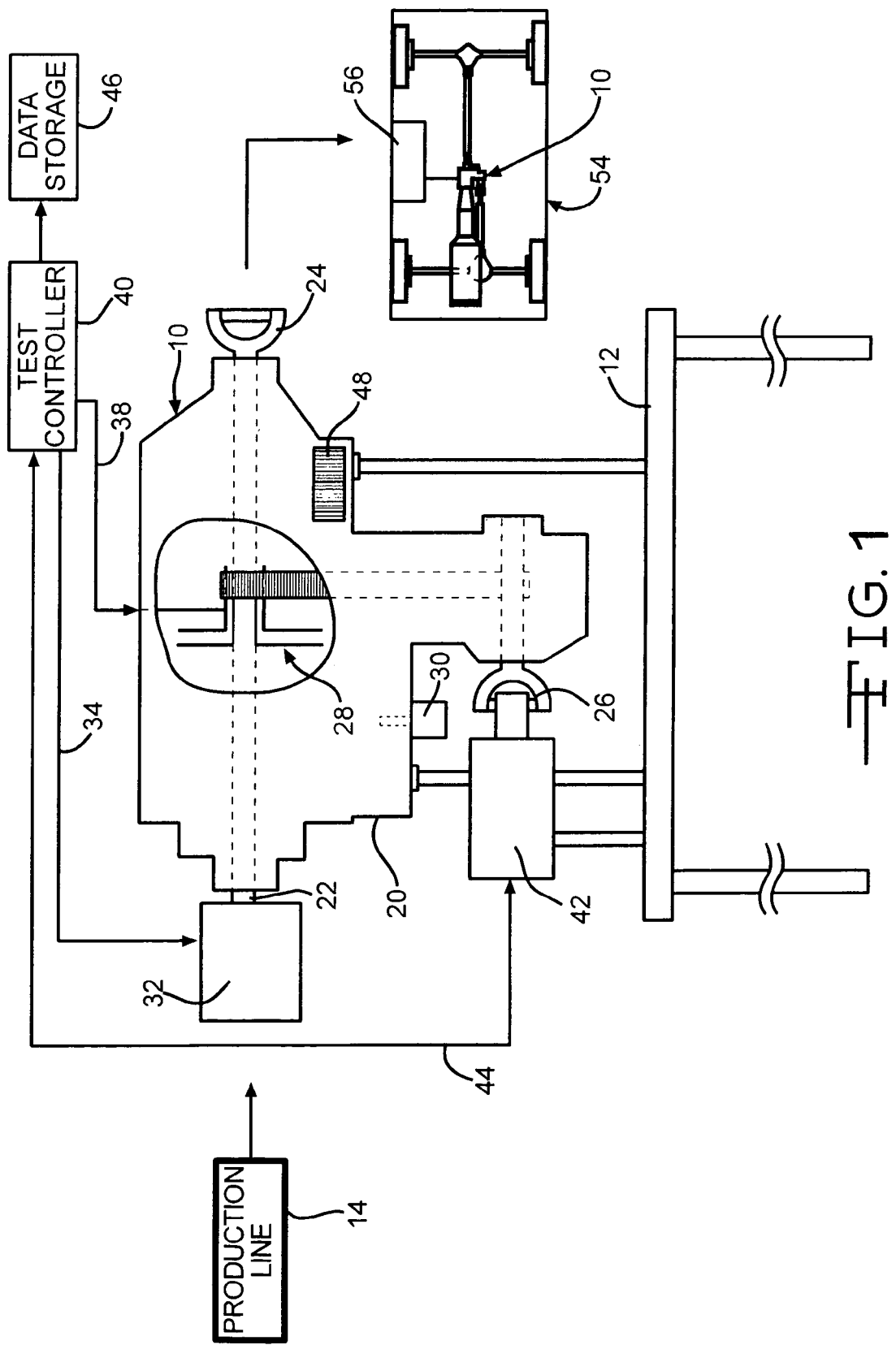
FIG. 1 is a diagrammatic view of the testing of an individual transfer case to determine secondary driveline its clutch drive current versus torque transfer function or curve according to the present invention.

Referring now to FIG. 1, portions of the transfer case calibration method according to the present invention are illustrated. A transfer case assembly 10 is placed upon a test stand or fixture 12 at the completion of its manufacture on and through a conventional production line 14. The transfer case assembly 10 includes a housing 20, an input shaft 22 which is coupled to and driven by the output of an automatic or manual transmission (not illustrated) of a four wheel drive vehicle. The input shaft 22 may directly drive an output shaft 24 or the two shafts may be coupled through a range selection device such as a planetary gear train (not illustrated) to provide both a direct (high gear) and a reduced speed (low gear) output. Operably disposed between the primary output shaft 24 and a secondary output shaft 26 is a modulatable secondary driveline clutch assembly 28. The modulatable secondary driveline clutch assembly 28 may be an electric, electromechanical, hydraulic, electrohydraulic or any other type of modulatable friction clutch. The modulatable clutch assembly 28 provides adjustable torque transfer between the primary output shaft 24 and the secondary output shaft 26 in response to a variable electrical or hydraulic input. The terms "secondary driveline clutch" and "secondary clutch" used herein with regard to the modulatable clutch assembly 28 are intended to clarify that 1) this clutch is not the clutch associated with a speed reduction gearset which is utilized in a transfer case such as the transfer case assembly 10 to select between high and low speed (gear) operating ranges and 2) this clutch is associated with and provides drive torque to the secondary driveline (typically the front driveline) in a four wheel drive vehicle. Preferably, the transfer case assembly 10 also includes a temperature sensor 30 which is immersed in the clutch and lubricating fluid within the transfer case assembly 10 and provides a signal indicating the fluid temperature to a transfer case control module (TCCM) in the vehicle in which the transfer case assembly 10 is ultimately installed.

On the test stand 12, a drive motor 32, which is preferably electrically powered, is secured with its output connected to the input shaft 22. The electric drive motor 32 is driven through a cable 34 by the output of a controller or microprocessor 40 which is capable of controlling and monitoring the rotational power generated by the electric drive motor 32 which is delivered to the input shaft 22 of the transfer case 10.

The controller or microprocessor 40 also provides a control signal in a line 38 directly to the modulatable clutch assembly 28. Alternatively, if the transfer case assembly 10 utilizes a hydraulic clutch, the signal from the controller 40 and the line 38 is provided to a suitable proportional hydraulic control valve such as a spool valve or other appropriate electromechanical device.

Secured to the secondary output shaft 26 of the transfer case assembly 10 is a load and transducer assembly 42 which is capable of both loading the secondary output shaft 26 and simultaneously measuring the torque delivered to the secondary output shaft 26 through the modulatable secondary clutch assembly 28. Both drive signals and sensed torque signals are communicated from and to the controller or microprocessor 40 through a multiple conductor cable 44. Data from the diagnostic testing may be temporarily or permanently stored in a volatile or non-volatile storage device 46 which may include a printer to provide a written record of the performance of the individual transfer case assemblies 10.

After the transfer case assembly 10 has undergone a diagnostic test to determine the clutch current versus secondary torque throughput function, as more fully described below, a label 48 bearing indicia such as a bar code or any other coded or uncoded data storage and display device is affixed to the transfer case assembly 10. Alternatively, this information may be tabulated for transfer into a non-volatile RAM. This may be done via the existing ALDL (Assembly Line Diagnostics Link) port during, for example, engine/body calibration and controller download by a singular CAN (Car Area Network) message. The transfer case assembly 10 is then removed from the test stand 12 and provided to an original equipment motor vehicle manufacturer (OEM) which installs it in a four wheel drive motor vehicle such as an SUV, pick-up truck, cross-over vehicle or passenger car 54. The motor vehicle 54 thus includes the transfer case assembly 10 and a transfer case control module (TCCM) 56 having various associated sensors, sensor inputs, memory and an output which drives the secondary clutch assembly 28 in the transfer case assembly 10.

Figure 2:
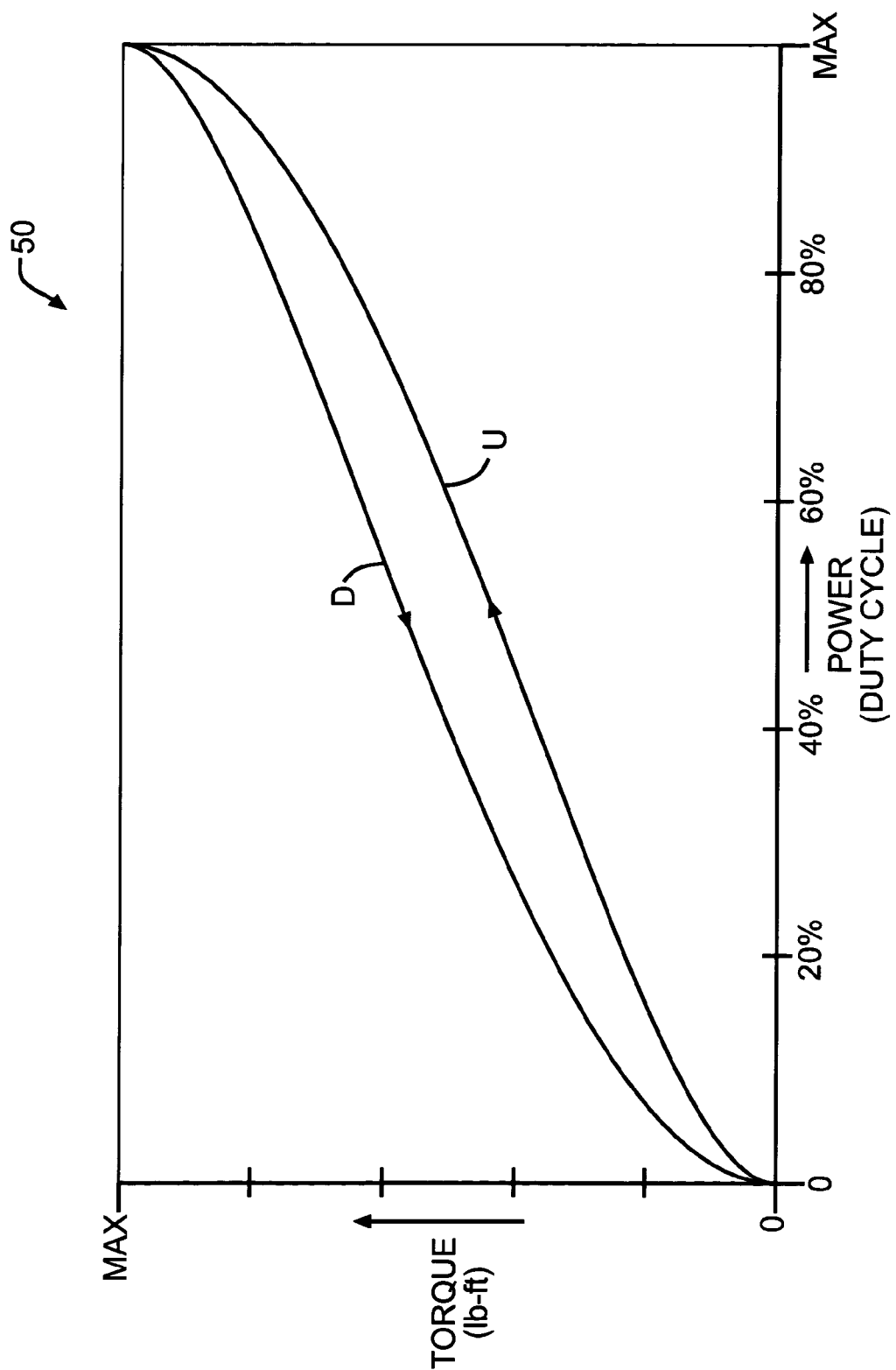
FIG. 2 is a typical performance curve of a transfer case secondary driveline clutch showing clutch drive current versus torque throughput.

Referring now to FIG. 2, a clutch current versus torque throughput function or curve is illustrated. This function or curve is typical of transfer case clutches and for purposes of explanation, it will be assumed that it is the performance graph of the modulatable secondary clutch assembly 28 disposed within the transfer case assembly 10 illustrated in FIG. 1. The X (horizontal) distance represents 0 to 100% of the maximum power or drive signal applied to the electromagnetic coil of the clutch assembly 28. Specifically, it may be interpreted as a PWM (pulse width modulated) duty cycle of the electrical drive to the electromagnetic clutch coil. Alternatively, it may represent a corresponding signal which drives an electrohydraulic controller or control valve to actuate a hydraulic secondary clutch. The Y (vertical) distance indicates the torque output appearing on the secondary output shaft 26 in, for example, pounds feet (lbs. ft.), Newton meters (Nm) or other torque measurement scale. The lower curve, curve U (up) represents the curve or function as the electric current applied to the electromagnetic coil is increased up to the maximum 100% duty cycle at the right end of the curve. The curve D (down) represents the performance of the clutch assembly 28 as the current is decreased. The separation of the two curves U and D is the result of typically encountered hysteresis in the electromagnetic or hydraulic operator and friction clutch as those familiar with such devices will readily appreciate. It will also be appreciated that the hysteresis has been exaggerated somewhat for purposes of illustration and clarity. The curve illustrated in the graph 50 may then be stored temporarily in the controller or microprocessor 40 or may be transferred to the storage device 46 or be provided to a printer to produce a printed, tangible record. In either case, the specific curve 50 is associated with the serial number or other identifying indicia of the particular transfer case assembly 10 tested.

It should be understood that depending upon the sensitivity of the instrumentation utilized in the calibration or diagnostic procedure and the quantitative tolerance or difference within which a curve or function is deemed to be the same and outside of which the curve or function is deemed to be different, an exceedingly large number of different curves or functions will be generated.

Figure 3:
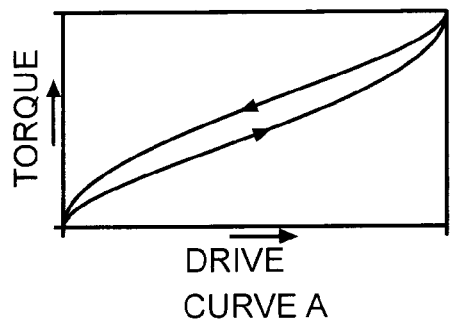
FIG. 3 is a selection of a plurality of transfer case secondary clutch curves against which the performance of each transfer case clutch is matched according to the present invention.
Figure 3:
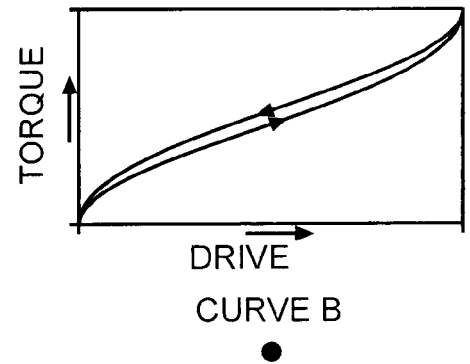
Figure 3:
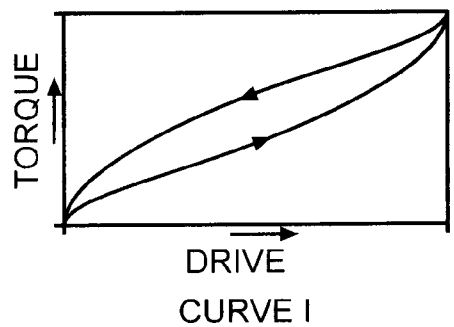
Figure 3:
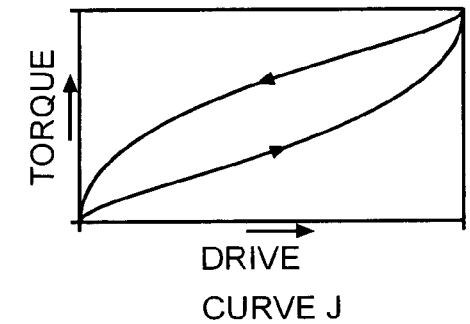
Figure 3:
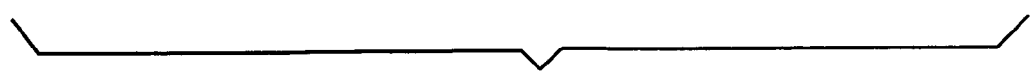

Referring now to FIG. 3, a plurality of different though similar torque output versus drive signal or duty cycle curves or functions are presented. In order to minimize the data required and difficulties involved in utilizing each individual and distinct performance curve to calibrate an associated transfer case control module controller with which the clutch and transfer case assembly 10 are ultimately utilized, the calibration and operation process has been simplified by creating a relatively small number, typically 8, 10, 12 or more or fewer, curves representative of varying clutch torque versus drive signal relationships. It has been found that such a relatively small number of such curves can be utilized to characterize the variations between transfer cases to a sufficiently high degree of accuracy that does not justify storage and utilization of each individually detected curve or function. In FIG. 3, it is assumed that ten representative curves or functions A, B, C, D, E, F, G, H, I and J have been pre-established. For reasons of simplicity and clarity only curves A, B, I and J have been illustrated, it being understood that the other six curves or functions will be similar.

Selection of one of the 8, 10 or 12 curves or functions is undertaken by conventional "best fit" software or programs. Upon selection of one of the curves which best fits the performance of the transfer case clutch 28 determined on the test stand 12, the identity of the curve is associated with the transfer case 10 either physically or electronically. For example, an indicia 48 such as a bar code bearing the code of the selected curve as well as, for example, the serial number of the transfer case may be secured thereto. Alternately, the data may be stored in a data processing features of the transfer case assembly 10 to be read by complementary equipment such as the transfer case module 56 or the CAN, as noted above, disposed in the vehicle 54 in which it installed.

Figure 4:
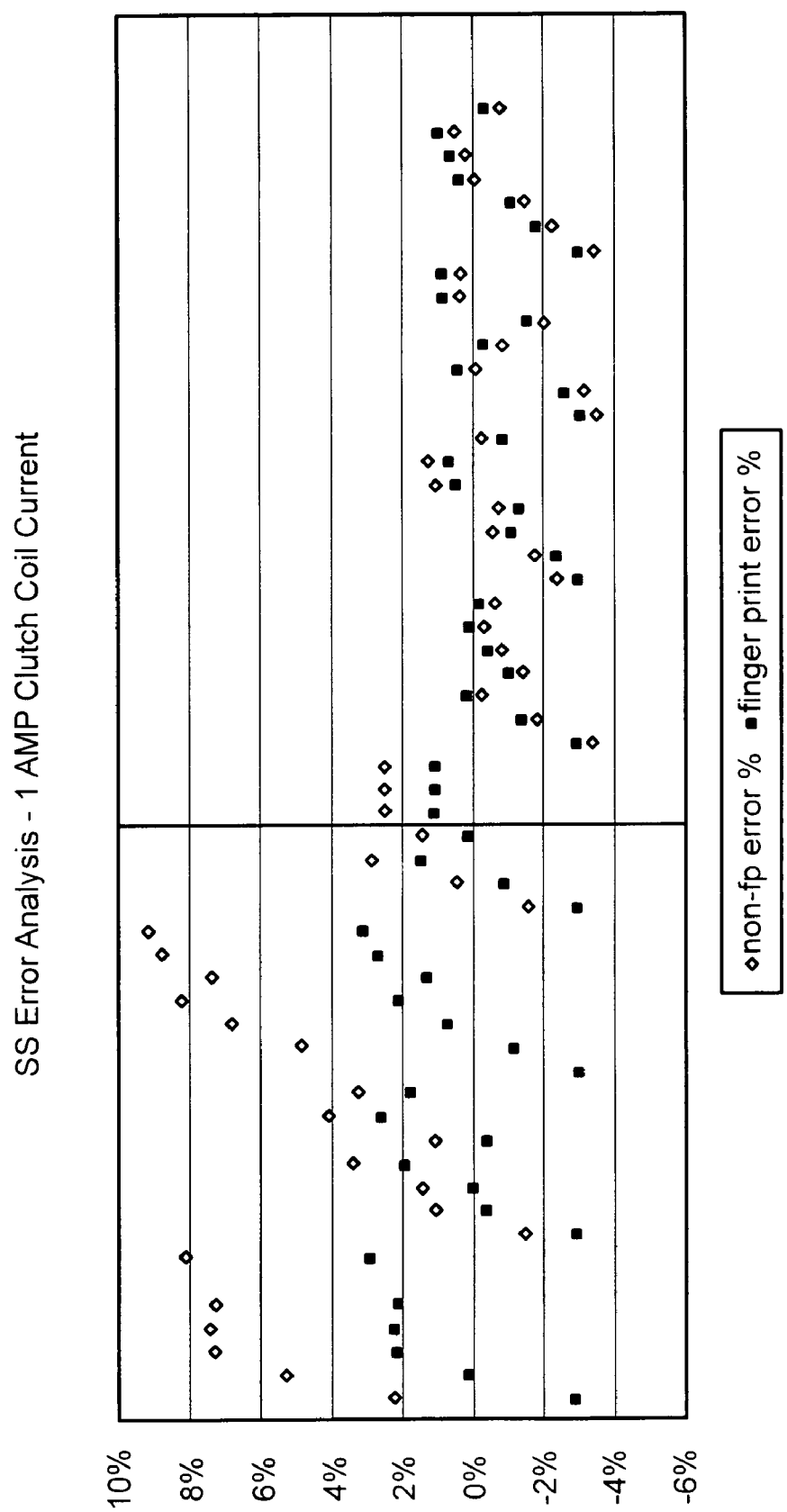
FIG. 4 is an error analysis plot illustrating the reduced scatter of a transfer case secondary clutch drive signal versus torque transfer function with and without utilization of the present method.

Referring now to FIG. 4, improvements achieved by individual calibration of transfer case assemblies 10 is presented. To the left of the vertical line are scattered data points indicating variations above and below a nominal or average torque versus drive signal relationship. To the right of the vertical line is similar data derived from performance of calibrated transfer case clutch assemblies 28 which provide such calibration data to a vehicle controller thereby improving control and the predictability of control of torque output in accordance with the vehicle manufacturer's software.

Referring now to FIG. 5, the various factors which have been determined to contribute to clutch drive torque output variations are illustrated. The first section relates to inter-unit variation, i.e., variations between different transfer cases. The data presented in FIG. 5 illustrates that operational, that is torque throughput variations, can be reduced from 7% to 1% by utilizing the method and calibrated transfer case assemblies 10 according to the present invention. Similarly, variations caused by the primary or pilot clutch in a transfer case may be reduced from 10% to 5%.

With regard to intra-unit variations, that is, variations occurring within a particular transfer case 10 due to, for example, the operating temperature of the transfer case or its age. It should also be appreciated that performance improvements may be achieved. Such performance improvements are discussed below with regard to FIGS. 6 and 7. Compensating for the effect of operating temperature on clutch performance can reduce clutch performance variations from 2.8% to 1%. Similarly, aging of the transfer case, particularly the aging of clutch surfaces and clutch fluid can effect a variation of 14% in the torque output versus drive signal function. By monitoring such variables, clutch torque output variation can be reduced to 2%. As FIG. 5 therefore illustrates, the use of clutch calibration, monitoring of operating temperature and accounting for age and wear can reduce variations in the torque output versus drive signal relationship of a transfer case from 33% to 9%.

Figure 6A:
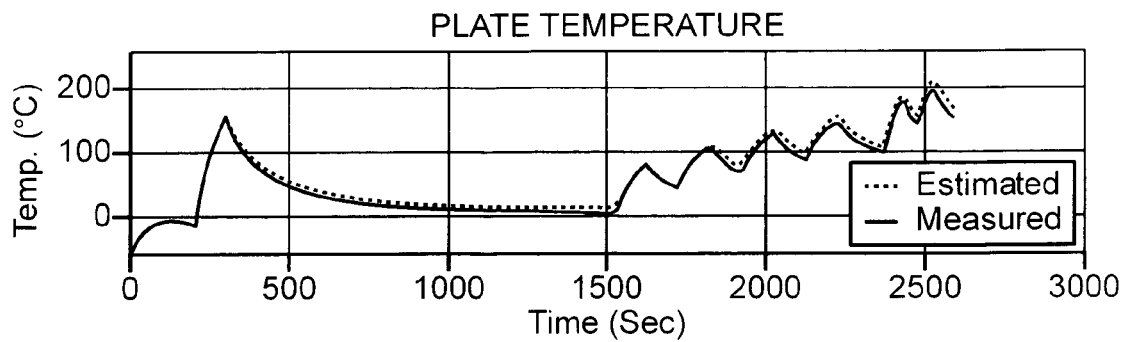
FIGS. 6A, 6B and 6C are a series of graphs illustrating the effect of temperature on transfer case secondary clutch performance.
Figure 6B:
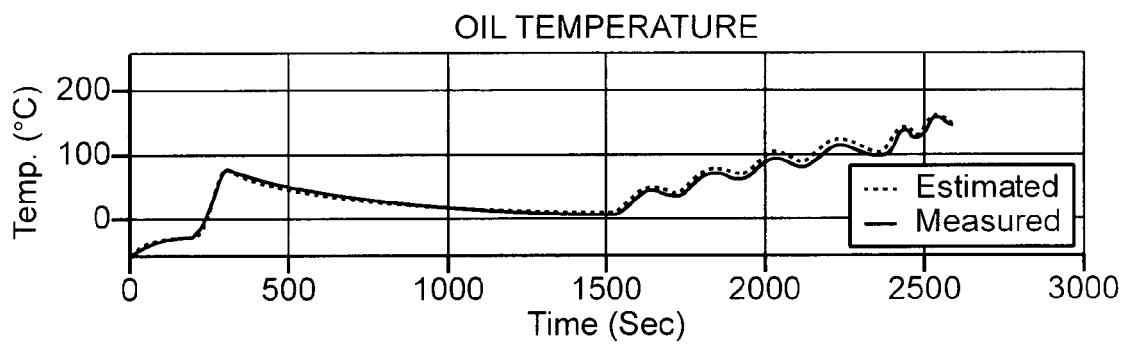
Figure 6C:
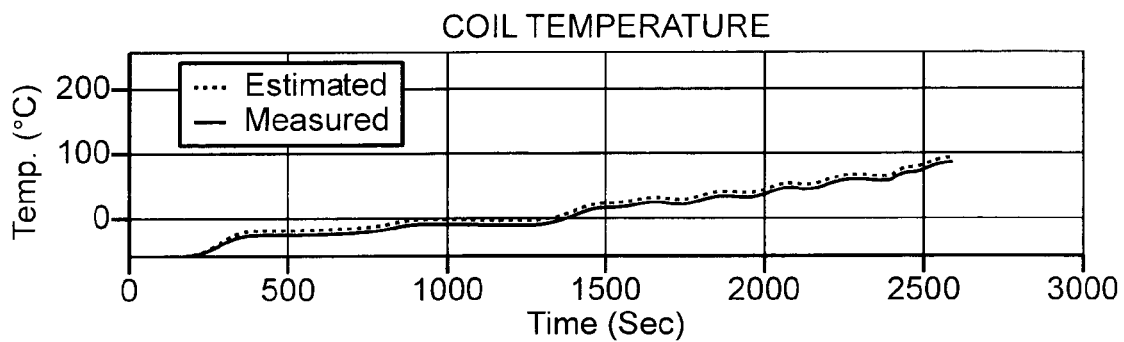

Referring now to FIG. 6A, 6B and 6C, graphs illustrating clutch (friction) plate temperature, clutch fluid (oil) temperature and electromagnetic coil temperature of an intermittently energized electromagnetic friction pack clutch such as the secondary clutch assembly 28 in a transfer case assembly 10 as a function of time are presented. From such graphs, it is apparent that the temperatures of the friction plates, the clutch fluid and the electromagnetic coil all rise appreciably as the transfer case operates. Generally speaking, such temperature rise reduces the friction coupling and torque delivery through the secondary clutch 28 of the transfer case 10 for a given magnitude of input or drive signal in a known and relatively predictable linear relationship. For example, as the temperature of the electromagnetic coil of the clutch rises, its electrical resistance does as well. For a given drive voltage and current, the power dissipated in the coil and thus the magnetic force and finally the delivered torque will be less than that delivered at a lower temperature. However, assuming a linear relationship creates errors unless the clutch operation curve is accurately known, as it is through use of the present method. Equipping the transfer case assembly 10 with a temperature sensor 30, as illustrated in FIG. 1, provides data that may be utilized by the vehicle transfer case control module 56 to provide compensation in accordance with experimental or empirically developed relationships, thereby improving the stability and repeatability of the drive signal versus torque delivery function of the modulatable secondary driveline clutch assembly 28. Knowing the operating temperature of the transfer case assembly 10 allows the friction plate torque estimate (FIG. 6A) to converge to the actual plate torque based on a Kalman filter. (A Kalman filter is set of equations that provides an efficient way to establish the state of a process.)

Figure 7:
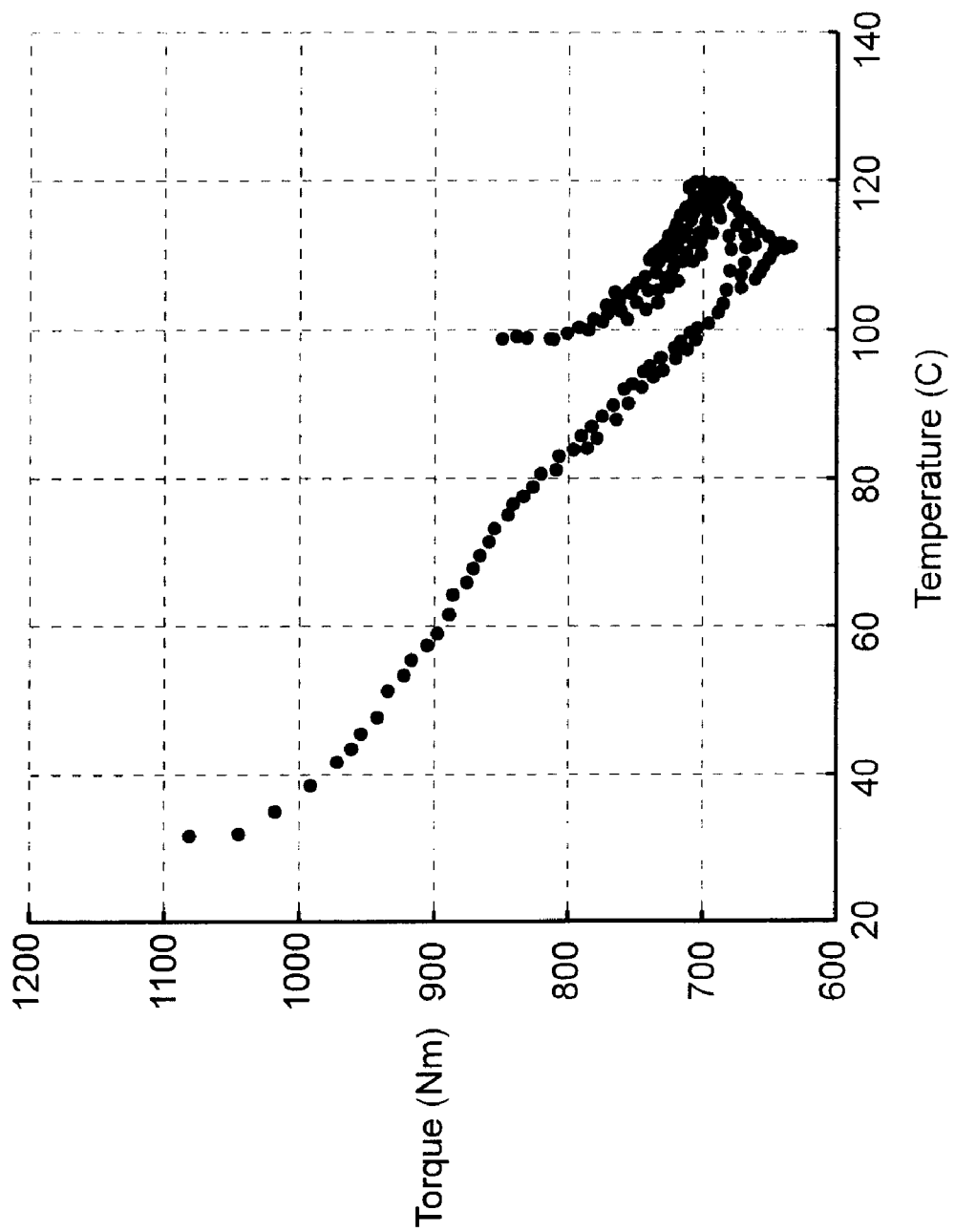
FIG. 7 is a graph of transfer case clutch performance illustrating the effect of aging and wear of the transfer case secondary clutch.

Referring now to FIG. 7, a graph presenting clutch performance as a function of age, oil and other service and life related variables is illustrated. On the X (horizontal) axis are transfer case operating temperatures in degrees Centigrade increasing from left to right. On the Y (vertical) axis are clutch torque throughput magnitudes and Newton meters, increasing from bottom to top. The graph is, in fact, three dimensional and the data points presented in the X-Y space are also related to the number of cycles. The higher number of cycles, generally speaking, the smaller the Y distance and the lower the torque throughput. It has been found experimentally that age, oil and other service life related variables effect, from 2.5% to 14%, clutch signal input versus clutch torque output over the life of a clutch. Accordingly, operational programming based upon the graph of FIG. 7 can be installed within the software or memory of the transfer case control module 56 of the vehicle 54 into which the transfer case assembly 10 is installed in order to compensate for such wear and service life related variables and further improve the torque transfer function and repeatability of the transfer clutch assembly 28.

The foregoing disclosure is the best mode devised by the inventors for practicing this invention. It is apparent, however, that methods incorporating modifications and variations will be obvious to one skilled in the art of achieving improved transfer case clutch performance. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A method of enhancing transfer case performance in a motor vehicle comprising the steps of:
   providing a transfer case having an input, a clutch and a secondary output,
   providing a motor for supplying torque to said input, a controller for controlling a drive signal to said clutch and means for sensing torque delivered to said secondary output,
   modulating said drive signal so as to move said transfer case clutch through a complete engagement cycle, wherein said engagement cycle commences and ends at a disengagement position or at a maximum engagement position, determining a drive signal versus torque function for said clutch, associating a drive signal versus torque function profile with said transfer case, and storing said associated profile in machine readable format with said transfer case.

2. The method of enhancing transfer case performance of claim 1, wherein the associated profile is selected from a plurality of predetermined function profiles.

3. The method of enhancing transfer case performance of claim 2 wherein said plurality of function profiles is 12 or fewer.

4. The method of enhancing transfer case performance of claim 2 wherein said associated profile is bar coded.

5. The method of enhancing transfer case performance of claim 1 wherein said clutch is an electromagnetic friction clutch.

6. The method of enhancing transfer case performance of claim 1 further including the step of providing a temperature sensor in said transfer case.

7. The method of enhancing transfer case performance of claim 6 wherein data from said temperature sensor is provided to a transfer case control module in a motor vehicle.

8. The method of enhancing transfer case performance of claim 1 wherein said associated profile is provided to a transfer case control module of a motor vehicle.

9. A method of improving transfer case performance comprising the steps of:

providing a transfer case having an input, a secondary output clutch and a secondary output, providing a drive motor for supplying torque to said input and a sensor for sensing torque delivered to said secondary output, cycling said secondary output clutch from a minimum drive signal to a maximum drive signal and returning to said minimum drive signal, determining a drive signal versus torque function for said secondary output clutch, matching said drive signal versus torque function to one of a number of predetermined function profiles, and associating the matched profile with said transfer case.

10. The method of enhancing transfer case performance of claim 9 wherein the matched profile is stored in a machine readable format with said transfer case.

11. The method of enhancing transfer case performance of claim 9 wherein the matched profile is provided to a transfer case control module.

12. The method of enhancing transfer case performance of claim 9 wherein said number of predetermined function profiles is 12 or fewer.

13. The method of enhancing transfer case performance of claim 9 wherein said clutch is an electromagnetic friction clutch.

14. The method of enhancing transfer case performance of claim 9 further including the step of providing a temperature sensor in said transfer case.

15. The method of enhancing transfer case performance of claim 14 further including the step of adjusting said drive signal versus torque function based on temperature.

16. A method of improving transfer case performance in a motor vehicle comprising the steps of:

providing a transfer case having an input, a secondary output clutch, a variable engagement signal governing the engagement of the secondary output clutch, and a secondary output, determining an engagement signal versus torque output function for said secondary output clutch, fitting said engagement signal versus torque output function to one of a plurality of predetermined function profiles, storing the profile with said transfer case, and providing said profile to a transfer case control module.

17. The method of claim 16 wherein the profile is stored in a machine readable format.

18. The method of claim 16 wherein said transfer case control module is disposed in a motor vehicle.

19. The method of claim 16 further including the step of sensing a temperature of a fluid in said transfer case and providing such fluid temperature to said transfer case control module.

20. The method of claim 16 further including the step of providing data to a transfer case control module regarding age and wear characteristics of the secondary output clutch.

* * * * *